US007437255B2

United States Patent
Woodmansee et al.

(10) Patent No.: US 7,437,255 B2
(45) Date of Patent: Oct. 14, 2008

(54) METHOD AND SYSTEM FOR CALIBRATING TRIAXIAL ACCELERATION SENSORS

(75) Inventors: Mark Allen Woodmansee, Minden, NV (US); Jeffrey Alan Ham, Minden, NV (US); Lam Arthur Campbell, Minden, NV (US); Elizabeth Anne Oakden, Gardnerville, NV (US); Robert Paul Stachow, Carson City, NV (US); David John Sevey, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/656,741

(22) Filed: Jan. 22, 2007

(65) Prior Publication Data

US 2008/0177492 A1   Jul. 24, 2008

(51) Int. Cl.
*G01P 21/00*   (2006.01)
(52) U.S. Cl. .......................................... 702/95; 702/94
(58) Field of Classification Search ............... 702/94–95
See application file for complete search history.

(56) References Cited

U.S. PATENT DOCUMENTS

| | | | |
|---|---|---|---|
| 4,398,417 A | 8/1983 | Shutt | |
| 5,589,634 A | 12/1996 | Nagahara et al. | |
| 5,932,803 A | 8/1999 | Wyse | |
| 5,962,788 A | 10/1999 | Fawcett | |
| 6,826,960 B2 | 12/2004 | Schaad et al. | |
| 6,876,926 B2 * | 4/2005 | Kirkland et al. | 701/220 |
| 7,131,315 B2 | 11/2006 | Rojo et al. | |
| 7,178,401 B2 | 2/2007 | Byrd | |
| 2007/0073502 A1 * | 3/2007 | Umeda | 702/96 |

* cited by examiner

*Primary Examiner*—Bryan Bui
*Assistant Examiner*—Jonathan Moffat
(74) *Attorney, Agent, or Firm*—Armstrong Teasdale LLP

(57) ABSTRACT

A method for calibrating a sensor includes providing a fixture that defines a first coordinate system, providing a chassis, and orienting a plurality of sensor elements to form a misaligned coordinate system, wherein the misaligned coordinate system axes are oriented at other than right angles with respect to each other. The method also includes coupling the sensor to be calibrated to the fixture and mathematically compensating the misaligned coordinate system to correspond with the first coordinate system.

18 Claims, 3 Drawing Sheets

METHOD AND SYSTEM FOR CALIBRATING TRIAXIAL ACCELERATION SENSORS

BACKGROUND OF THE INVENTION

This invention relates generally to sensors, and more particularly, to methods and systems for calibrating triaxial accelerometers.

Known calibration techniques used in calibrating triaxial accelerometers (triax) generally compensate individual stress sensors for full scale and bias output variations, then mathematically adjust the stress sensor elements so they are oriented orthogonally to each other and are arranged in a Cartesian coordinate system. A rotation transformation then aligns the triax with a known laboratory coordinate system. That is, a triax's coordinate system is rotated to match a laboratory reference frame defined by a calibration fixture. The laboratory reference frame may be associated with the reference frame on a tool face having fiducial marks or common reference surfaces.

Triaxial accelerometer assembly is generally a tedious process. Moreover, because of relatively low sales volume, little investment in automated triaxial assembly processes has been made. Additionally, some components of triaxial accelerometers are durable, such as the frame, but other components, such as the stress sensor elements may be fragile and/or expensive. In addition, coupling one end of a stress sensor element to a triaxial accelerometer chassis and the opposite end of the stress sensor element to a suspended proof mass such that the stress sensor elements are oriented orthogonally to each other may be difficult. Moreover, the process of orthogonally orienting the stress sensor elements with respect to each other is generally subjective and as a result, small misalignments may be created between stress sensor elements. Such misalignments may adversely affect the triaxial accelerometer's calibration which decreases its measurement accuracy.

BRIEF DESCRIPTION OF THE INVENTION

In one aspect, a method for calibrating a sensor is provided. The method includes providing a fixture that defines a first coordinate system, providing a chassis, and orienting a plurality of sensor elements to form a misaligned coordinate system, wherein the misaligned coordinate system axes are oriented at other than right angles with respect to each other. The method also includes coupling the sensor to be calibrated to the fixture and mathematically compensating the misaligned coordinate system to correspond with the first coordinate system.

In another aspect, a calibration system is provided that includes a fixture for defining a first coordinate system, a chassis, a sensor coupled to the fixture and a plurality of sensor elements oriented to form a misaligned coordinate system having misaligned coordinate axes oriented at other than right angles with respect to each other, wherein a sensor output is mathematically compensated such that the misaligned coordinate system corresponds with the first coordinate system.

In yet another aspect, a calibration system controller is provided that includes a processor for optimizing calibration parameters of a sensor to compensate for a misaligned coordinate system of the sensor, such that the misaligned coordinate system is aligned with a first coordinate system by determining a decomposed force vector $\vec{F}_i = A(\{I\vec{S}\}\vec{V}_i + \vec{b})$, wherein $\vec{F}_i$ is the decomposed force vector, A is an alignment matrix, $\vec{S}$ is a scale vector, $\vec{V}$ is a voltage vector, $\vec{b}$ is a bias vector, and I is an identity matrix.

DETAILED DESCRIPTION OF THE INVENTION

Figure 1:
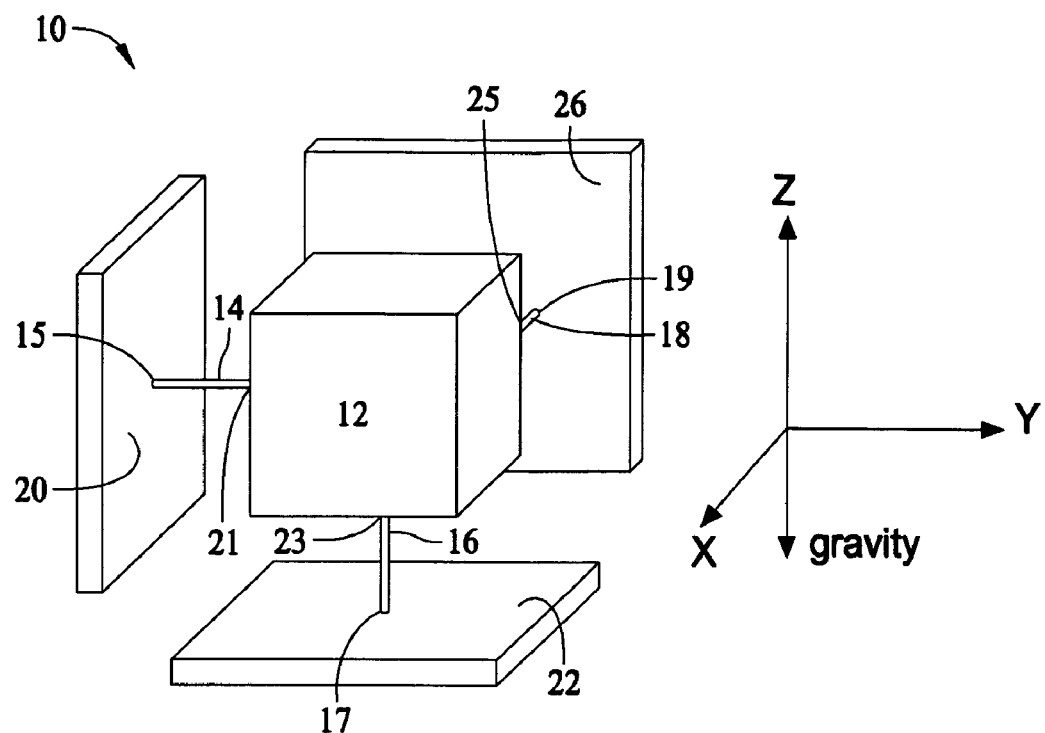
FIG. 1 is a perspective view of an exemplary proof mass supported by a single triad of stress sensor elements.

FIG. 1 is a perspective view of an exemplary triaxial accelerometer, also known as a triax sensor 10, including a single triad of stress sensor elements 14, 16 and 18. More specifically, in the exemplary embodiment, a proof mass 12 is supported by the triad of stress sensor elements 14, 16 and 18. Each stress sensor element 14, 16 and 18 includes a first end 15, 17 and 19, respectively, and a second end 21, 23 and 25, respectively. The first ends 15, 17 and 19 of stress sensor elements 14, 16 and 18 are coupled to triax sensor chassis 20, 22 and 26, respectively, and the second ends 21, 23 and 25 are each coupled to corresponding faces of proof mass 12.

Triax sensor 10 is generally calibrated on an optically flat surface using an adjustable calibration fixture (not shown) designed to hold triax sensor 10 in a stationary orientation. The fixture is designed to facilitate accurately locating triax sensor 10 with respect to the fixture's known Cartesian coordinate system. The fixture has three precision rotation stages mounted orthogonally with respect to one another. During calibration, micro-positioners (not shown) on each stage are adjusted to change the orientation of triax sensor 10. The outputs of stress sensor elements 14, 16 and 18 are recorded for each orientation.

More specifically, for a given orientation of triax sensor 10, the output of stress sensor elements 14, 16 and 18 may change based upon the gravitational force imposed on the individual elements 14, 16 and 18 that support proof mass 12. The data from the output of elements 14, 16 and 18 are then correlated to the three-dimensional position of triax sensor 10 in the fixture. Triax sensor 10 is then rotated several times, such that elements 14, 16 and 18 experience varying levels of tension or compression based on their alignment with the gravitational field.

Figure 2:
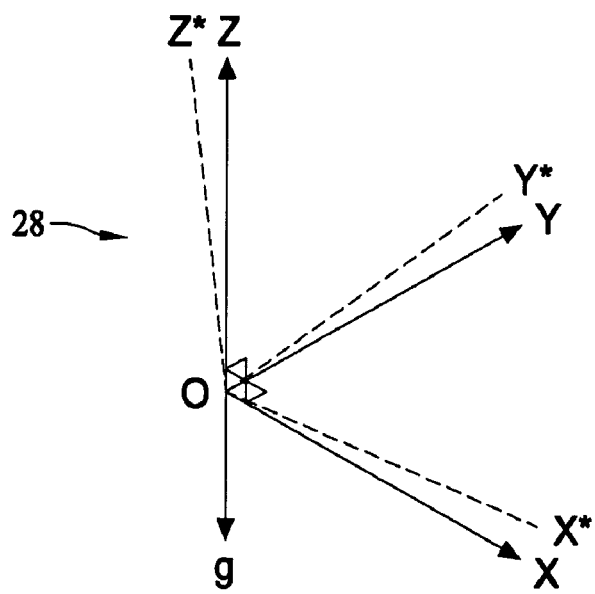
FIG. 2 is an exemplary three-dimensional triaxial coordinate system including misaligned axes of a triaxial sensor that are orthogonally oriented with respect to each other.

FIG. 2 is an exemplary three-dimensional triax sensor coordinate system 28 including known axes X, Y, and Z, and misaligned axes X*, Y* and Z*. It should be understood that the known axes X, Y, and Z represent axes defined by respective planes of the calibration fixture, and that misaligned axes X*, Y* and Z* are defined by elements 14, 16, and 18 and are ideally assumed or known to be orthogonal with respect to each other. During alignment of two orthogonal coordinate systems, three unique rotations of triax sensor 10 with respect to the fixture's X, Y and Z axes are required to orient the two coordinate systems such that they are identical.

Figure 3:
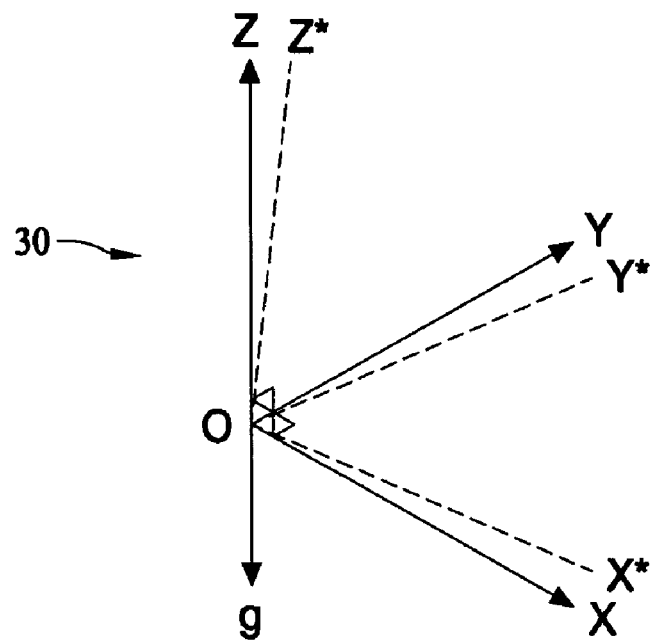
FIG. 3 is a three dimensional triaxial coordinate system including misaligned axes of a triaxial sensor that are non-orthogonally oriented with respect to each other.

FIG. 3 is an exemplary three dimensional triax sensor coordinate system 30 designated by X, Y, and Z axes, including misaligned and deformed axes X*, Y*, and Z*. It should be appreciated that the misaligned and deformed axes X*, Y*, and Z* are not orthogonal oriented with respect to each other and are not related or aligned with the X, Y and Z axes.

Generally, to completely calibrate and align triax sensor 10, misaligned axes X*, Y* and Z* are mathematically compensated, i.e., rotated, scaled, and biased, to substantially correspond with the known X, Y, and Z axes of the fixture. As a first step, a misalignment matrix M is used to mathematically adjust the output of the stress sensor elements 14, 16 and 18 such that their output emulates mutually orthogonal X*, Y* and Z* axes. When the stress sensor elements 14, 16 and 18 of triad sensor 10 are not orthogonally oriented with respect to each other, as shown in FIG. 3, symmetric misalignment matrix M is defined as shown below:

$$M = \begin{bmatrix} 1 & -m_{xy} & -m_{xz} \\ -m_{xy} & 1 & -m_{yz} \\ -m_{xz} & -m_{yz} & 1 \end{bmatrix}.$$

It should be understood that misalignment matrix M compensates for stress sensor elements 14, 16 and 18 that are not physically orthogonal to one another. In matrix M, each off diagonal entry is related to the angle between the axes X*, Y* and Z* on triax sensor 10 such that if the axes are mutually orthogonal, then $|m_{xy}|=|m_{xz}|=|m_{yz}|=0$. If they are not mutually orthogonal then one or more of the three terms will not be equal to zero.

Figure 4:
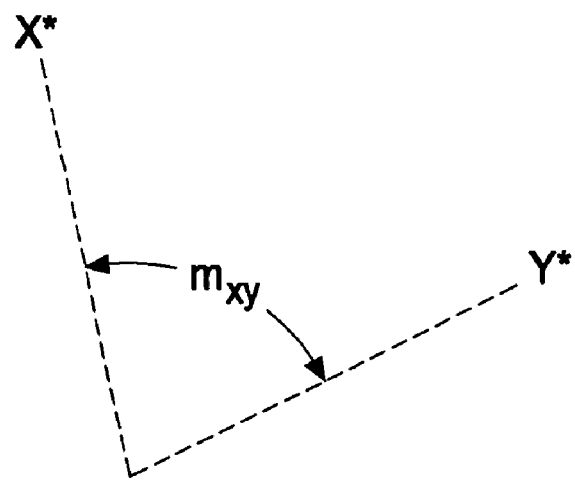
FIG. 4 is a schematic diagram illustrating a Y* axis not orthogonal to an X* axis.

FIG. 4 is an exemplary schematic diagram of the situation when defined Y*-axis of a triax is not truly orthogonal to the X*-axis. To show non-orthogonality, both the X* and Y* unit vectors are assumed to lie in the plane defined by the page. Since the angular distance between X* and Y* is less than 90-degrees (acute), then $m_{xy} \neq 0$. Equally important, the angle between the X and Y-axes is the same regardless of whether the included angle is referenced to the X* or the Y* axis. This implies M matrix symmetry, i.e. $m_{xy}=m_{yx}$. Consequently, using a single triad of stress sensor elements, requires only three quantities $m_{xy}$, $m_{xz}$, and $m_{yz}$ to reform the X*, Y*, and Z*-axes such that they are mutually orthogonal to one another. It should be appreciated that misalignment matrix M functions only to ensure that stress sensor elements are orthogonal with respect to each other, and does not relate stress sensor elements to the calibration fixture's laboratory reference frame.

Figure 5:
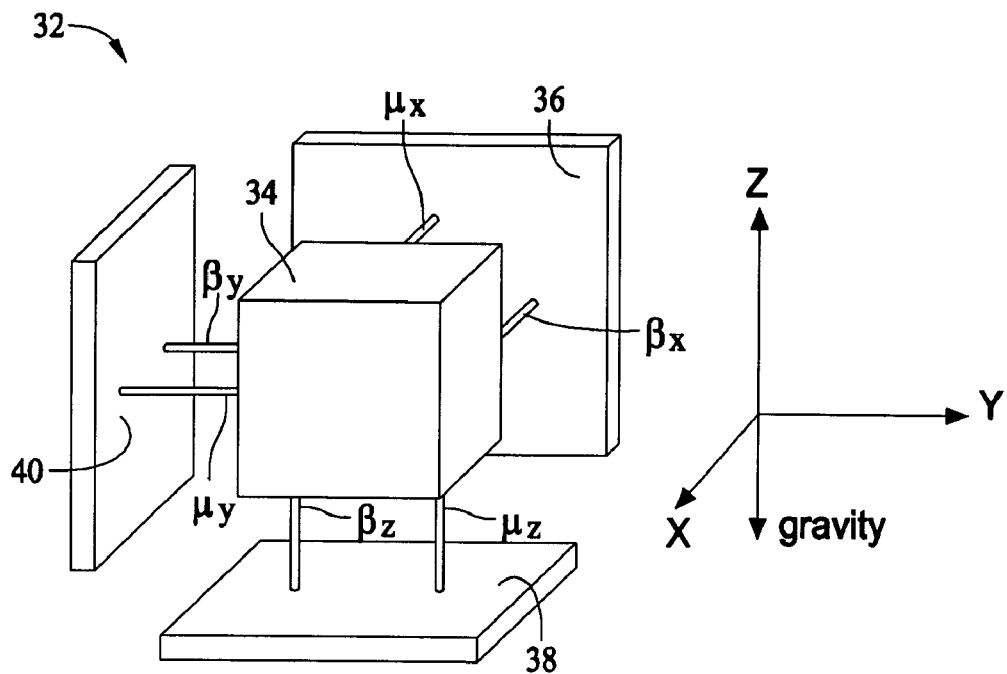
FIG. 5 is a perspective view of an exemplary proof mass supported by two triads of stress sensor elements.

FIG. 5 is a perspective view of an exemplary triaxial accelerometer, also known as triax sensor 32, including two triads, μ and β, of stress sensor elements, a proof mass 34 and members 36, 38, and 40 that together constitute a single chassis. A first triad μ includes stress sensor elements $\mu_x$, $\mu_y$, and $\mu_z$, while a second triad β includes stress sensor elements $\beta_x$, $\beta_y$, and $\beta_z$. Each stress sensor element $\mu_x$, $\mu_y$, $\mu_z$, $\beta_x$, $\beta_y$, and $\beta_z$, generates a voltage such that each triad of elements generates a total of three voltages. The three voltages $$\vec{V} = \begin{bmatrix} V_x \\ V_y \\ V_z \end{bmatrix}$$

of each triad of stress sensor elements are converted into a decomposed force vector $$\vec{F} = \begin{bmatrix} F_x \\ F_y \\ F_z \end{bmatrix}$$

using equation (1) below:

$$\vec{F}_i = M(\{I\vec{S}\}\vec{V}_i + \vec{b}) \quad (1)$$

In equation (1), M is the misalignment matrix, $\vec{S}$ is a scale vector given by $$\vec{S} = \begin{bmatrix} S_x \\ S_y \\ S_z \end{bmatrix},$$

$\vec{b}$ is a bias vector or voltage offset given by $$\vec{b} = \begin{bmatrix} b_x \\ b_y \\ b_z \end{bmatrix}$$

and I is the identity matrix. It should be understood that scale vector $\vec{S}$ is the full-scale output correction factor for a given stress sensor element $\mu_x$, $\mu_y$, $\mu_z$, $\beta_x$, $\beta_y$, and $\beta_z$, and that the subscript i denotes a number of orientations of triax sensor 32 during calibration. In the exemplary embodiment, elements $\mu_x$, $\mu_y$, $\mu_z$, $\beta_x$, $\beta_y$, and $\beta_z$ generate potentiometric (voltage) outputs. However, it should be appreciated that although the exemplary embodiment uses potentiometric outputs, other embodiments may use any other type output, such as, but not limited to, frequency, phase and current-impetus, that enables calibrating triax sensor 32 as described herein.

In the exemplary embodiment, the calibration fixture defines a laboratory reference frame that is used to align triax sensor elements $\mu_x$, $\mu_y$, $\mu_z$, $\beta_x$, $\beta_y$, and $\beta_z$ with reference or fiducial marks (not shown) on the calibration fixture denoting the fixture's known X, Y and Z axes. It should be appreciated that the calibration fixture includes at least one automated movement stage to sequentially rotate triax sensor 32 in a prescribed manner and acquires and saves outputs of sensor elements $\mu_x$, $\mu_y$, $\mu_z$, $\beta_x$, $\beta_y$, and $\beta_z$ during calibration. Misalignment matrix M does not relate the stress sensor elements $\mu_x$, $\mu_y$, $\mu_z$, $\beta_x$, $\beta_y$, and $\beta_z$, to the laboratory reference frame, so it is inadequate for alignment. Instead, an asymmetric alignment matrix A is defined that has six independent terms: $a_{xy}$; $a_{xz}$; $a_{yx}$; $a_{yz}$; $a_{zx}$, and $a_{zy}$. These six independent terms serve to reform the X*, Y* and Z*-axes to ensure orthogonality and subsequently align them with X, Y and Z-axes of the fixture. It should be understood that because alignment matrix A is asymmetric, quantities on opposite sides of the diagonal are not necessarily equal. For example, $a_{xy}$ is not necessarily equal to $a_{yx}$. Alignment matrix A is defined below:

$$A = \begin{bmatrix} 1 & -a_{xy} & -a_{xz} \\ -a_{yx} & 1 & -a_{yz} \\ -a_{zx} & -a_{zy} & 1 \end{bmatrix} \quad (3)$$

It should be understood that the subscripts in alignment matrix A are defined to relate an axis of triax sensor 32 with a plane defined by the X, Y and Z-axes of the calibration fixture.

Figure 6:
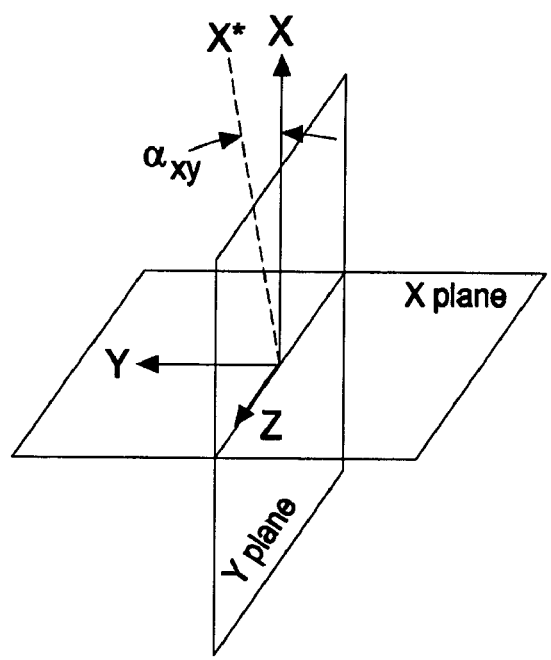
FIG. 6 is a schematic diagram illustrating the orientation of a triax sensor's X-axis with respect to a calibration fixture's Y-plane.

FIG. 6 is a schematic diagram illustrating the orientation of triax sensor 32's X-axis with respect to the calibration fixture's Y-plane. More specifically, the term $a_{xy}$ references the misalignment of triax sensor 32's X*-axis with respect to the calibration fixture's Y-plane.

Triax sensor 32 has three linearly independent force components (i.e. $F_x$, $F_y$, $F_z$) that are determined using the following equation:

$$\vec{F}_i = A(\{IS\}\vec{V}_i + \vec{b}). \tag{3a}$$

For any given orientation, a correctly calibrated triax sensor 32 has a force vector, $\vec{F}_i$, that should match an imposed field magnitude $\vec{F}_{ig}$, such that a residual $\zeta$ shown below in equation (4) should equal zero.

$$\zeta = \sum_i \sum_j^3 (F_{igj} - F_{ikj})^2 \tag{4}$$
$$= \sum_i (F_{igx} - F_{ikx})^2 + (F_{igy} - F_{iky})^2 + (F_{igz} - F_{ikz})^2$$
$$= 0$$

However, due to calibration instrument imperfections and random error, residual $\zeta$ generally does not equal zero. Consequently, calibration is designed to minimize $|\zeta|$ by taking its derivative and setting it equal to zero, i.e. $\vec{\nabla}_\alpha \zeta = 0$.

Additionally, $\vec{F}_{ig}$, is generally the earth's gravitational field, such that $F_{ig}^2 = g^2 = \{9.81 \text{ m/s}^2\}^2$. In the exemplary embodiment, the gravity vector is determined by taking a plumb line (not shown), and is resolved into three components along the fixture's X, Y and Z-axes as follows:

$$-\vec{F}_{ig} = -\begin{bmatrix} F_{gx} \\ F_{gy} \\ F_{gz} \end{bmatrix}.$$

The solution to equation (4) is simplified by using the first two terms of its Taylor series expansion as shown in equation (5) below:

$$\zeta_k = \sum_i \left\{ \vec{F}_{ig} - \left( \vec{F}_{ik} + \vec{\nabla}_\alpha \vec{F}_{ik}^T \delta\vec{\alpha} \right) \right\}^2. \tag{5}$$

In equation (5), $\alpha$ is a solution vector containing twelve terms and is given by $\vec{\alpha} = [S_x, S_y, S_z, a_{xy}, a_{xz}, a_{yx}, a_{yz}, a_{zx}, a_{zy}, b_x, b_y, b_z]^T$, and $\delta\vec{\alpha}$ is an associated correction factor used to iteratively minimize $\zeta$. The indices i and k represent the $i^{th}$ orientation of triax sensor 32 and the $k^{th}$ iteration used for minimizing the residual $\zeta_k$ from equation (5), such that the derivative of the objective function, $\vec{\nabla}_\alpha \zeta$, equals zero (i.e. $\vec{\nabla}_\alpha \zeta = 0$). Thus, to calculate $\delta\vec{\alpha}$ for use in equation (5) the derivative of $\vec{\nabla}_\alpha \zeta$ is computed for each orientation i and each iteration k and set equal to zero. Using the computed derivatives, a matrix H is defined and the following linear system shown below at (6) is obtained:

$$H\delta\vec{\alpha} = \vec{R}, \tag{6}$$

where $$H = \sum_i \vec{\nabla}_\alpha \vec{F}_{ik} \vec{\nabla}_\alpha \vec{F}_{ik}^T \tag{6a}$$

and $$\vec{R} = \sum_i \vec{\nabla}_\alpha \vec{F}_{ik} (\vec{F}_{ig} - \vec{F}_{ik}). \tag{6b}$$

Matrix H includes individual elements that are calculated as shown below in equation (7):

$$h_{lm} = \sum_i \sum_j^3 (\partial F_{ij}/\partial \alpha_l)(\partial F_{ij}/\partial \alpha_m), \tag{7}$$

wherein l and m are the row and column indices, respectively, and j iterates through the X, Y and Z components of triax force vector $\vec{F}_i$. $\vec{R}$ is a vector whose individual elements are calculated as shown below in equation (8):

$$R_l = \sum_i \sum_j^3 (\partial F_{ij}/\partial \alpha_l)(F_{igj} - F_{ij}), \tag{8}$$

wherein l and m are the row and column indices, respectively, and j iterates through the X, Y and Z components of $\vec{F}_i$. It should be understood that the individual elements in the H matrix and the $\vec{R}$ vector are recalculated for each iteration k to account for changes in solution vector $\vec{\alpha}$. $\vec{\nabla}_\alpha \vec{F}_{ik}$ contains twelve partial derivatives used in equations (7) and (8) that are determined in the following equations (9a-9l):

$$\partial \vec{F}_{ik}/\partial \alpha_1 = \partial \vec{F}_{ik}/\partial S_x = V_x \begin{bmatrix} 1 \\ -a_{yx} \\ -a_{zx} \end{bmatrix} \tag{9a}$$

$$\partial \vec{F}_{ik}/\partial \alpha_2 = \partial \vec{F}_{ik}/\partial S_y = V_y \begin{bmatrix} -a_{xy} \\ 1 \\ -a_{zy} \end{bmatrix} \tag{9b}$$

$$\partial \vec{F}_{ik}/\partial \alpha_3 = \partial \vec{F}_{ik}/\partial S_z = V_z \begin{bmatrix} -a_{xz} \\ -a_{yz} \\ 1 \end{bmatrix} \tag{9c}$$

$$\partial \vec{F}_{ik}/\partial \alpha_4 = \partial \vec{F}_{ik}/\partial a_{xy} = \begin{bmatrix} -S_y V_y - b_y \\ 0 \\ 0 \end{bmatrix} \tag{9d}$$

$$\partial \vec{F}_{ik}/\partial \alpha_5 = \partial \vec{F}_{ik}/\partial a_{xz} = \begin{bmatrix} -S_z V_z - b_z \\ 0 \\ 0 \end{bmatrix} \tag{9e}$$

$$\partial \vec{F}_{ik}/\partial \alpha_6 = \partial \vec{F}_{ik}/\partial a_{yx} = \begin{bmatrix} 0 \\ -S_x V_x - b_x \\ 0 \end{bmatrix} \tag{9f}$$

-continued $$\partial \vec{F}_{ik} / \partial \alpha_7 = \partial \vec{F}_{ik} / \partial a_{yz} = \begin{bmatrix} 0 \\ -S_z V_z - b_z \\ 0 \end{bmatrix} \quad (9g)$$

$$\partial \vec{F}_{ik} / \partial \alpha_8 = \partial \vec{F}_{ik} / \partial a_{zx} = \begin{bmatrix} 0 \\ 0 \\ -S_x V_x - b_x \end{bmatrix} \quad (9h)$$

$$\partial \vec{F}_{ik} / \partial \alpha_9 = \partial \vec{F}_{ik} / \partial a_{zy} = \begin{bmatrix} 0 \\ 0 \\ -S_y V_y - b_y \end{bmatrix} \quad (9i)$$

$$\partial \vec{F}_{ik} / \partial \alpha_{10} = \partial \vec{F}_{ik} / \partial b_x = \begin{bmatrix} 1 \\ -a_{yx} \\ -a_{zx} \end{bmatrix} \quad (9j)$$

$$\partial \vec{F}_{ik} / \partial \alpha_{11} = \partial \vec{F}_{ik} / \partial b_y = \begin{bmatrix} -a_{xy} \\ 1 \\ -a_{zy} \end{bmatrix} \quad (9k)$$

$$\partial \vec{F}_{ik} / \partial \alpha_{12} = \partial \vec{F}_{ik} / \partial b_z = \begin{bmatrix} -a_{xz} \\ -a_{yz} \\ 1 \end{bmatrix} \quad (9l)$$

In the exemplary embodiment, after determining matrix H and twelve component vector $\vec{R}$, a two-step process is used to increase the accuracy of the calibration process, or determine optimized values of solution vector $\vec{\alpha}$. The first step involves choosing appropriate initial values for solution vector $\vec{\alpha}$ and solving the linear system (6) using a standard matrix inversion algorithm. Initial values of solution vector $\vec{\alpha}$ are determined by assuming triax sensor 32 is correctly aligned with the laboratory reference frame defined by the calibration fixture (not shown) and the stress sensor elements $\mu_x$, $\mu_y$, and $\mu_z$, and $\beta_x$, $\beta_y$, and $\beta_z$, respectively, are orthogonal to one another. Thus, alignment matrix A is assumed to be an identity matrix, scale vector $\vec{S}$ is also assumed to be an identity matrix and bias vector $\vec{b}$ is assumed to be zero. It should also be understood that in the exemplary embodiment, linear system (6) is solved using LU decomposition. It should be appreciated that although the exemplary embodiment uses LU decomposition, other embodiments may use any method to solve linear system (6) that enables calibrating triax sensor 32 as described herein.

In the exemplary embodiment, correction factor $\delta \vec{\alpha}_k$ is determined by inverting matrix H as shown below in equation (10):

$$\delta \vec{\alpha}_k = H^{-1} \vec{R} \quad (10)$$

During the second step, correction factor $\delta \vec{\alpha}_k$ is used to update chosen solution vector $\vec{\alpha}$ to determine an optimized solution vector $\vec{\alpha}_{k+1}$ in the manner shown in equation (11) below:

$$\vec{\alpha}_{k+1} = \vec{\alpha}_k + \delta \vec{\alpha}_k. \quad (11)$$

The iterative process continues until $\delta \vec{\alpha}_k < \vec{\epsilon}$, where $\vec{\epsilon}$ is a vector of user-defined convergence criterion for each element of $\delta \vec{\alpha}_k$. In an alternative exemplary embodiment, a user may choose a convergence scalar $\eta$ such that the iteration ceases when $\zeta < \eta$. In the alternative embodiment, the user selects a single value to identify algorithm convergence. Regardless of which convergence metric is chosen, the iterative process determines the twelve arguments of solution vector $\vec{\alpha}$. Each one of the twelve arguments in solution vector $\vec{\alpha}$ is used in Equation (3a) to compensate for triaxial stress sensor element $\mu_x$, $\mu_y$, $\mu_z$, $\beta_x$, $\beta_y$, and $\beta_z$ misalignment, scaling, and bias with respect to imposed force vector $\vec{F}_{ig}$. It should be appreciated that as the number of triax sensor 32 orientations i increases, the uncertainty associated with solution vector $\vec{\alpha}$ components concomitantly decreases.

In the exemplary embodiment, a minimum of twelve unique triax sensor 32 orientations i are required for each triad $\mu$ and $\beta$ to define the terms in solution vector $\vec{\alpha} = [S_x, S_y, S_z, a_{xy}, a_{xz}, a_{yx}, a_{yz}, a_{zx}, a_{zy}, b_x, b_y, b_z]^T$. It should be understood that twelve independent orientations of triax sensor 32 are required to uniquely determine solution vector $\vec{\alpha}$. It should be appreciated that although the exemplary embodiment is described as requiring twelve independent orientations, in other embodiments, any number of orientations greater than twelve may be used.

Stress sensor elements are delicate devices, subject to failure when they experience significant compressive, tensile or moment (shear) forces. To fully support proof mass 34 without inducing premature failure in stress sensor elements, six or more stress sensor elements $\mu_x$, $\mu_y$, $\mu_z$, $\beta_x$, $\beta_y$, and $\beta_z$, are required. Stress sensor elements $\mu_x$, $\mu_y$, $\mu_z$, $\beta_x$, $\beta_y$, and $\beta_z$ balance the gravitational forces and moments imposed by proof mass 34. Because at least six stress sensor elements $\mu_x$, $\mu_y$, $\mu_z$, $\beta_x$, $\beta_y$, and $\beta_z$ are required, alignment matrix A shown in equation (3a) expands as shown below in equation (12):

$$A = \begin{bmatrix} 1 & -a_{xy}^\mu & -a_{xz}^\mu \\ -a_{yx}^\mu & 1 & -a_{yz}^\mu \\ -a_{zx}^\mu & -a_{zy}^\mu & 1 \\ 1 & -a_{xy}^\beta & -a_{xz}^\beta \\ -a_{yx}^\beta & 1 & -a_{yz}^\beta \\ -a_{zx}^\beta & -a_{zy}^\beta & 1 \end{bmatrix} \quad (12)$$

The calibration technique described herein may be tedious and repetitive. Thus, in the exemplary embodiment, a computer system (not shown) including a controller, a processor and memory is used to orient triax sensor 32 together with motorized precision mounts for the three axes of the calibration fixture.

As used herein, the term "processor" may include any programmable system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "processor".

Memory can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disk and disk drive, a writeable or re-writeable optical disk and disk drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disk, such as a CD-ROM or DVD-ROM disk, and disk drive or the like.

It should be appreciated that the computer system may be any type of computer system capable of performing the computations that enable calibrating triax sensor 32 as described herein. The computer system facilitates moving triax sensor 32 through triax orientations i, collects voltages generated by the elements $\mu_x$, $\mu_y$, $\mu_z$, $\beta_x$, $\beta_y$ and $\beta_z$, performs all the computations described herein and minimizes operator errors. Furthermore, the computer system may run unattended, permitting continuous twenty-four hour calibration periods.

The exemplary embodiment as described herein facilitates minimizing the number of steps required to calibrate a triaxial sensor with respect to a known frame of reference, such as, but not limited to, a coordinate system. For example, the exemplary embodiment may be used to align and compensate an uncalibrated triax sensor to a known reference frame on a drill tool face when a triax sensor is to be used as part of an orientation module in a down hole drilling operation. Eliminating steps from the compensation, rotation and calibration processes, facilitates minimizing systematic and random errors associated with handling and rotating the triax sensor during calibration, output compensation, and sensor insertion steps. More specifically, the exemplary embodiment aligns triad stress sensor element outputs to be orthogonal, compensates for scale and bias factors in stress sensor element output, and rotates the triax sensor's coordinate system to match a laboratory reference frame. Moreover, the exemplary embodiment uses a single set of calibration data to perform the alignment and rotation, such that triaxial accelerometer designs with non-Cartesian (i.e. non-orthogonal) stress sensor element geometries are rotated to a known Cartesian reference frame, such as, but not limited to, the reference frame of the laboratory calibration fixture.

In each embodiment the above-described calibration method facilitates less labor intensive and more accurate calibration of non-orthogonally oriented stress sensor elements. More specifically, in each embodiment, the method facilitates easier assembly and manufacture of triax sensors and facilitates automated calibration of triax sensors, by using three additional alignment terms in the relationship between the triax sensor outputs and the detected gravitational (or other imposed) force on the triax sensor. As a result, triax sensor calibration is more accurate and faster to perform, manufacturing throughput is increased, and triax sensors are fabricated that provide more accurate measurements. Accordingly, triax sensor performance and component useful life are each facilitated to be enhanced in a cost effective and reliable manner.

An exemplary embodiment of a calibration method is described above in detail. The method is not limited to use with the specific triax sensor configuration described herein, but rather, the method can be utilized independently and separately from other calibration components described herein. Moreover, the invention is not limited to the embodiment of the calibration method described above in detail. Rather, other variations of calibration methods may be utilized within the spirit and scope of the claims.

While the invention has been described in terms of various specific embodiments, those skilled in the art will recognize that the invention can be practiced with modification within the spirit and scope of the claims.

What is claimed is:

1. A method for calibrating an acceleration sensor, said method comprising:

providing a fixture that defines a first coordinate system;

providing a chassis;

orienting a plurality of sensor elements to form a misaligned coordinate system, wherein the misaligned coordinate system axes are oriented at other than right angles with respect to each other;

coupling the sensor to be calibrated to the fixture; and mathematically compensating the misaligned coordinate system to correspond with the first coordinate system by determining a decomposed force vector using the formula $\vec{F}_i = A(\{I\vec{S}\}\vec{V}_i + \vec{b})$, wherein $\vec{F}_i$ is the decomposed force vector, A is an alignment matrix, $\vec{S}$ is a scale vector, $\vec{V}$ is a voltage vector, $\vec{b}$ is a bias vector, and I is an identity matrix.

2. A method in accordance with claim 1 wherein orienting a plurality of sensor elements further comprises coupling a first end of each of the plurality of sensor elements to a respective one of the plurality of chassis; and coupling a second end of each of the plurality of elements to a respective face of a proof mass.

3. A method in accordance with claim 1 wherein orienting a plurality of sensor elements further comprises orienting at least two triads of sensor elements.

4. A method in accordance with claim 1 wherein mathematically compensating the misaligned coordinate system further comprises comparing a difference in an output of each sensor element against corresponding components of a gravitational vector using the equation $$\zeta = \sum_i \sum_j^3 (F_{igj} - F_{ikj})^2 = \sum_i (F_{igx} - F_{ikx})^2 + (F_{igy} - F_{iky})^2 + (F_{igz} - F_{ikz})^2,$$

where $\vec{F}_{ig}$ is the earth's gravitational field, $\vec{F}_i$ is a sensed force vector and $\zeta$ is a residual value that is required to be minimized.

5. A method in accordance with claim 4 further comprising:

iteratively computing a residual value for at least one orientation of the acceleration sensor; and selecting a smallest residual value computed for the at least one orientation until satisfying a convergence criteria defined by at least one of $\delta\vec{\alpha}_k < \vec{\epsilon}$ and $\zeta < \eta$.

6. A method in accordance with claim 1 wherein mathematically compensating the misaligned coordinate system further comprises:

determining a solution vector by choosing at least one initial value for the solution vector; and solving a linear system defined by $H\delta\vec{\alpha}_k = \vec{R}$, wherein $\delta\vec{\alpha}_k$ is a correction factor, H is a matrix having elements computed as $$h_{lm} = \sum_i \sum_j^3 (\partial F_{ij}/\partial \alpha_l)(\partial F_{ij}/\partial \alpha_m),$$

$\vec{\alpha}_k$ is the chosen solution vector and $\vec{R}$ is a vector.

7. A method in accordance with claim 6 further comprising determining an improved solution vector by adding the correction factor to the chosen solution vector.

8. A calibration system comprising:
   a fixture for defining a first coordinate system;
   a chassis;
   an acceleration sensor coupled to said fixture; and
   a plurality of sensor elements oriented to form a misaligned coordinate system having misaligned coordinate axes oriented at other than right angles with respect to each other, wherein a sensor output is mathematically compensated such that said misaligned coordinate system corresponds with said first coordinate system by determining a decomposed force vector from an equation given by $\vec{F}_i = A(\{I\vec{S}\}\vec{V}_i + \vec{b})$, where $\vec{F}_i$ is the decomposed force vector, A is an alignment matrix, $\vec{S}$ is a scale vector, $\vec{V}$ is a voltage vector, $\vec{b}$ is a bias vector, and I is an identity matrix.

9. A system in accordance with claim 8 wherein each of said plurality of sensor elements comprises a first end and a second end, each of said first ends is coupled to a respective one of said plurality of chassis; and
   each of said second ends is coupled to a respective face of a proof mass.

10. A system in accordance with claim 8 wherein said plurality of sensor elements further comprises at least two triads of sensor elements.

11. A system in accordance with claim 8 further comprising a minimum residual value determined from an objective function given by $$\zeta = \sum_i \sum_j^3 (F_{igj} - F_{ikj})^2 = \sum_i (F_{igx} - F_{ikx})^2 + (F_{igy} - F_{iky})^2 + (F_{igz} - F_{ikz})^2$$

where $\vec{F}_{ig}$ is the earth's gravitational field, $\vec{F}_i$ is a sensed force vector and $\zeta$ is said minimum residual value.

12. A system in accordance with claim 11 further comprising:
   a residual value iteratively computed for at least one orientation of the acceleration sensor; and
   a smallest residual value computed for said at least one orientation is selected when a convergence criteria defined by at least one of $\delta \vec{\alpha}_k < \epsilon$ and $\zeta < \eta$ is satisfied.

13. A system in accordance with claim 8 further comprising:
   a solution vector determined by choosing at least one initial value for said solution vector; and
   a linear system defined by $H\delta\vec{\alpha}_k = \vec{R}$, wherein $\delta\vec{\alpha}_k$ is a correction factor, H is a matrix having elements computed as $$h_{lm} = \sum_i \sum_j^3 (\partial F_{ij}/\partial \alpha_l)(\partial F_{ij}/\partial \alpha_m),$$

$\vec{\alpha}_k$ is said chosen solution vector and $\vec{R}$ is a vector.

14. A system in accordance with claim 13 further comprising an improved solution vector equaling a sum of said chosen solution vector and said correction factor.

15. A calibration system controller comprising:
   a processor for optimizing calibration parameters of an acceleration sensor to compensate for a misaligned coordinate system of said sensor, such that said misaligned coordinate system is aligned with a first coordinate system by determining a decomposed force vector $\vec{F}_i = A(\{I\vec{S}\}\vec{V}_i + \vec{b})$, wherein $\vec{F}_i$ is said decomposed force vector, A is an alignment matrix, $\vec{S}$ is a scale vector, $\vec{V}$ is a voltage vector, $\vec{b}$ is a bias vector, and I is an identity matrix.

16. A calibration system controller in accordance with claim 15 wherein said processor further determines a minimum residual value determined from an objective function given by $$\zeta = \sum_i \sum_j^3 (F_{igj} - F_{ikj})^2 = \sum_i (F_{igx} - F_{ikx})^2 + (F_{igy} - F_{iky})^2 + (F_{igz} - F_{ikz})^2$$

wherein $\zeta$ is the minimum residual value, $\vec{F}_{ig}$ is the earth's gravitational field and $\vec{F}_i$ is a sensed force vector.

17. A calibration system controller in accordance with claim 15 wherein said processor further determines a solution vector by choosing at least one initial value for said solution vector and solves a linear system defined by $H\delta\vec{\alpha}_k = \vec{R}$, wherein $\delta\vec{\alpha}_k$ is a correction factor, H is a matrix having elements computed as $$h_{lm} = \sum_i \sum_j^3 (\partial F_{ij}/\partial \alpha_l)(\partial F_{ij}/\partial \alpha_m),$$

$\vec{\alpha}_k$ is said chosen solution vector and $\vec{R}$ is a vector.

18. A calibration system controller in accordance with claim 15 further comprising a calibration fixture including at least one automated movement stage to sequentially rotate a triax sensor in a prescribed manner, said calibration fixture acquires and saves an output of said sensor elements during a calibration process.

* * * * *